(12) United States Patent
Cavalcanti et al.

(10) Patent No.: US 11,696,225 B2
(45) Date of Patent: Jul. 4, 2023

(54) EXTREME HIGH THROUGHPUT (EHT) COMMUNICATION OF QOS FRAMES DURING RESTRICTED TARGET WAKE TIME (R-TWT) SERVICE PERIODS

(71) Applicant: Intel Corporation, Santa Clara, CA (US)

(72) Inventors: Dave A. Cavalcanti, Portland, OR (US); Juan Fang, Portland, OR (US); Mohammad Mamunur Rashid, Hillsboro, OR (US); Carlos Cordeiro, Portland, OR (US); Cheng Chen, Camas, WA (US); Laurent Cariou, Milizac (FR); Javier Perez-Ramirez, North Plains, OR (US); Dibakar Das, Hilsboro, OR (US); Chittabrata Ghosh, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/751,018

(22) Filed: May 23, 2022

(65) Prior Publication Data
US 2022/0286947 A1 Sep. 8, 2022

Related U.S. Application Data

(63) Continuation of application No. 16/870,156, filed on May 8, 2020.
(Continued)

(51) Int. Cl.
*H04W 48/16* (2009.01)
*H04L 43/087* (2022.01)
(Continued)

(52) U.S. Cl.
CPC .......... *H04W 48/16* (2013.01); *H04L 43/087* (2013.01); *H04L 47/2416* (2013.01);
(Continued)

(58) Field of Classification Search
CPC .. H04L 43/087; H04L 47/2416; H04W 16/10; H04W 24/02; H04W 28/0289;
(Continued)

(56) References Cited

U.S. PATENT DOCUMENTS 10,965,650 B2 * 3/2021 Alanen ................. H04L 63/126
11,528,722 B2 * 12/2022 Cavalcanti ............ H04W 74/04
(Continued)

OTHER PUBLICATIONS

"U.S. Appl. No. 16/870,156, Non Final Office Action dated Sep. 27, 2022", 9 pgs.
(Continued)

*Primary Examiner* — Robert J Lopata
(74) *Attorney, Agent, or Firm* — Schwegman Lundberg & Woessner, P.A.

(57) ABSTRACT

An access point (AP) may be configured by processing circuitry to operate as a coordinator AP for performing BSS channel level coordination. The coordinator AP is configured to assign non-overlapping channels to one or more coordinated APs of overlapping BSSs to schedule time-sensitive traffic to help ensure bounded latency, jitter and reliability per BSS. In some embodiments, the AP may be configured for performing transmission level coordination and may initiate a coordinated transmission opportunity (TXOP) for resource assignment to control contention access among managed BSSs. To perform the BSS channel level coordination, the coordinator AP is configured to encode a multi-AP trigger frame (M-TF) to initiate the coordinated TXOP. The M-TF may be encoded to include a
(Continued)

time-sensitive operation IE indicating how each STA is to access the channel within the coordinated TXOP.

20 Claims, 7 Drawing Sheets

Related U.S. Application Data

(60) Provisional application No. 62/846,023, filed on May 10, 2019.

(51) Int. Cl.
*H04W 88/08* (2009.01)
*H04W 74/08* (2009.01)
*H04W 72/0446* (2023.01)
*H04L 47/2416* (2022.01)

(52) U.S. Cl.
CPC ... *H04W 72/0446* (2013.01); *H04W 74/0808* (2013.01); *H04W 88/08* (2013.01)

(58) Field of Classification Search
CPC ............. H04W 48/16; H04W 72/0446; H04W 74/0808; H04W 84/12; H04W 88/08
USPC ........................................................ 370/329
See application file for complete search history.

(56) References Cited

U.S. PATENT DOCUMENTS

| | | | |
|---|---|---|---|
| 2017/0055160 A1* | 2/2017 | Barriac | H04W 74/0816 |
| 2017/0339680 A1* | 11/2017 | Jia | H04W 52/0219 |
| 2018/0098336 A1* | 4/2018 | Alpert | H04W 16/10 |
| 2019/0223219 A1* | 7/2019 | Ahn | H04W 84/12 |
| 2019/0387524 A1* | 12/2019 | Asterjadhi | H04W 72/02 |
| 2020/0077350 A1* | 3/2020 | Gidvani | H04W 56/001 |
| 2020/0077421 A1* | 3/2020 | Asterjadhi | H04W 72/569 |
| 2020/0106579 A1* | 4/2020 | Cherian | H04W 52/40 |
| 2020/0267636 A1 | 8/2020 | Cavalcanti et al. | |
| 2020/0267737 A1* | 8/2020 | Nilsson | H04L 25/0204 |
| 2020/0036721 A1 | 11/2020 | Yang et al. | |
| 2020/0367210 A1* | 11/2020 | Yang | H04W 74/00 |
| 2021/0068197 A1* | 3/2021 | Kim | H04W 72/121 |
| 2021/0243756 A1* | 8/2021 | Kim | H04W 74/0841 |
| 2021/0306955 A1* | 9/2021 | Han | H04W 16/02 |

OTHER PUBLICATIONS

"U.S. Appl. No. 16/870,156, Response filed Nov. 16, 2022 to Non Final Office Action dated Sep. 27, 2022", 11 pgs.
"U.S. Appl. No. 16/870,156, Notice of Allowance dated Dec. 12, 2022", 10 pgs.

\* cited by examiner

Simple Round Robin with one BSS per period

Multiple BSSs within a transmission period with or without contention

EXTREME HIGH THROUGHPUT (EHT) COMMUNICATION OF QOS FRAMES DURING RESTRICTED TARGET WAKE TIME (R-TWT) SERVICE PERIODS

PRIORITY CLAIM

This application is a continuation of U.S. patent application Ser. No. 16/870,156, filed May 8, 2020, which claims priority under 35 USC 119(e) to U.S. Provisional Patent Application Ser. No. 62/846,023, filed May 10, 2019 [reference number AC2096-Z], each of which is incorporated herein by reference in its entirety.

TECHNICAL FIELD

Embodiments pertain to wireless communications. Some embodiments relate to time-sensitive networking extreme high throughput (EHT) time-sensitive networking.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
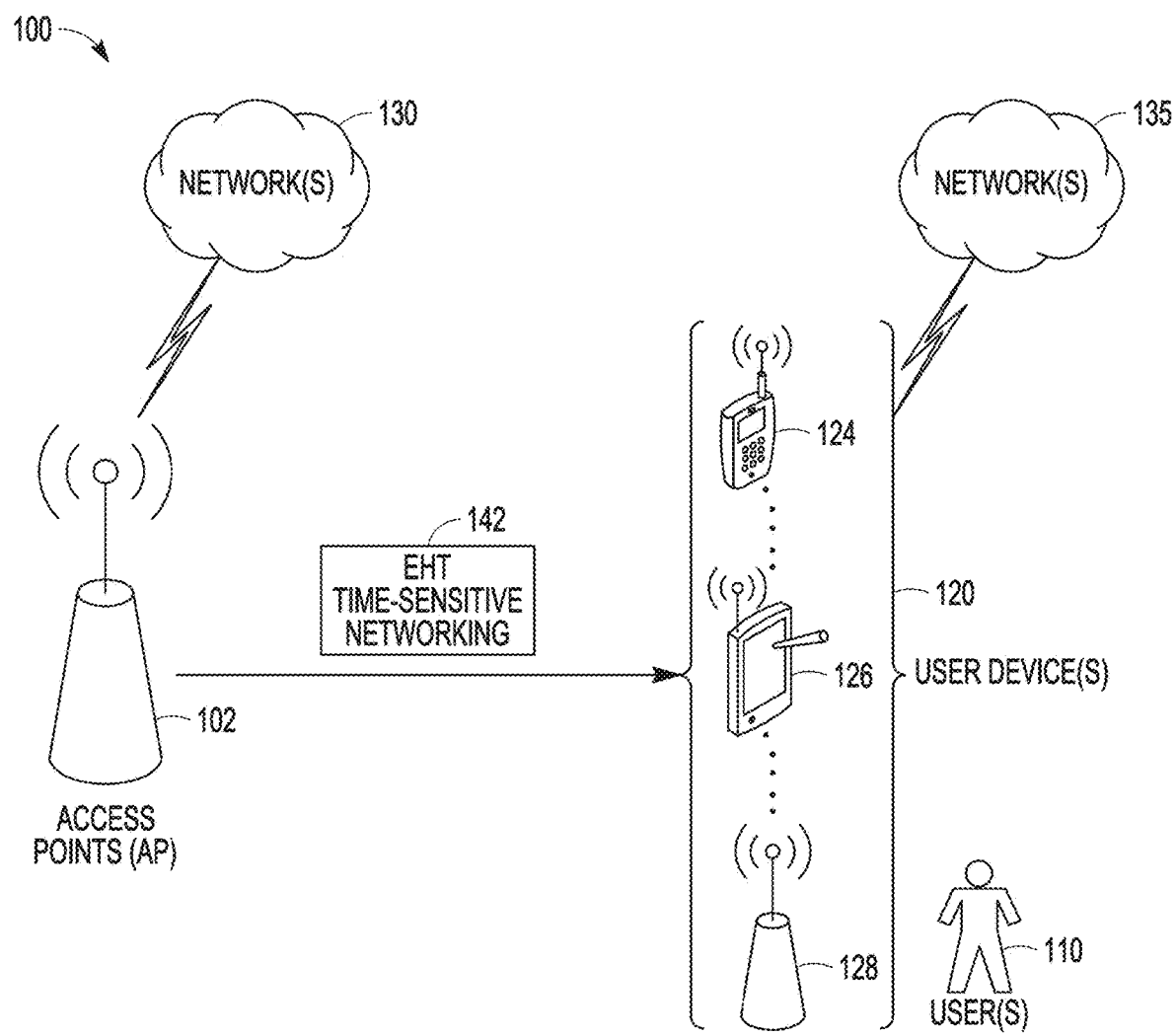
FIG. 1 is a network diagram illustrating an example network environment for EHT time-sensitive networking, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The worst-case latency and jitter are added in the scope of the next generation Wi-Fi project, 802.11be (also known as extreme high throughput (EHT)), which clearly mentioned that "this amendment defines at least one mode of operation capable of improved worst case latency and jitter."

Congestion due to contention within a basic service set (BSS) and across overlapping basic service sets (OBSSs) (Overlapping BSSs) causes variations in channel access latency. Although enhanced distributed channel access (EDCA), the main 802.11 medium access mechanism, has been successful in resolving contention, but it cannot provide harder bounds on latency/jitter, especially under congestion.

EHT is expected to operate in multiple scenarios:
  Unmanaged OBSSs: Multiple BSSs/APs may operate in an overlapping area without coordination. EDCA is the main access mode to resolve unmanaged contention/interference. EHT enhancements (e.g. throughput) can reduce latency/jitter, but performance will be limited by interference and contention.
  Managed OBSSs: Managed OBSSs consists of multiple BSSs operating in overlapping areas that can be managed and controlled, usually by a single entity. Example scenarios include factory, enterprises, and some multi-AP networks in homes. A more efficient channel access mode can be used to better control latency/jitter in such scenarios to enable bounded latency/jitter performance.

The problem of providing bounded latency/jitter in managed OBSS scenarios where it is feasible to manage and coordinate the operation of the 802.11 devices (STAs and APs) may need to be addressed. Previous solutions included hybrid coordination function-controlled channel access (HCCA) fully scheduled channel access, but it has not been adopted in practice. Other solutions may include trigger-based access enabled scheduled operation in 802.11ax and scheduled access is supported in the 802.11 DMG/EDMG. The HCCA introduced fully scheduled channel access, but it has not been adopted in practice. Some of the reasons include:
  EDCA has addressed most requirements so far, therefore added complexity was not justified. However, new time-sensitive requirements have emerged, which are not expected to be met with EDCA going forward.
  The coordination problem between HCCA APs has not been addressed in previous standards.
  HCCA doesn't leverage the 802.11ax trigger-based access capabilities to reduce overhead and improve efficiency.

Trigger-based access enabled scheduled operation in 802.11ax and it can be leveraged to provide more predictable channel access with a few enhancements. Although trigger-based access is enabled in 802.11ax, it is still mainly based on the contention access mode (DCF/EDCA) and there is no capability to disable contention from STAs, nor between multiple overlapping APs.

Scheduled access is supported in the 802.11 DMG/EDMG. The AP/PCP can schedule contention-free service periods (SPs) and contention-based access periods (CBAPs) are enabled in 802.11ad, but these modes are not compatible with the trigger-based OFDMA access, which is the main operation mode for EHT. Example embodiments of the present disclosure relate to systems, methods, and devices for scheduling framework to support time-sensitive networking and real-time applications in EHT.

In some embodiments, an apparatus of an access point (AP) comprising processing circuitry; and memory is disclosed herein. When configured by the processing circuitry to operate as a coordinator AP for performing basic service set (BSS) channel level coordination, the coordinator AP may be configured to assign non-overlapping channels to one or more coordinated APs of overlapping BSSs (OBSSs) to schedule time-sensitive traffic to help ensure bounded latency, jitter and reliability per BSS. To perform the BSS channel level coordination, the processing circuitry of the coordinator AP may be configured to exchange channel management frames with the coordinated APs. The channel management frames indicate one or more channels to be used for the time-sensitive traffic. To further perform the BSS channel level coordination, the processing circuitry of the coordinator AP may be configured to coordinate usage of the one or more channels to be used for the time-sensitive traffic to steer traffic and avoid congestion and latency issues that would be caused by mixing the time-sensitive traffic with other traffic on a same channel. When configured by the processing circuitry to operate as a coordinator AP for performing transmission level coordination, the coordinator AP may be configured to initiate a coordinated transmission opportunity (TXOP) for resource assignment to control contention access among the one or more coordinated APs of the OBSSs. To perform the BSS channel level coordination, the processing circuitry of the coordinator AP may be configured to encode a multi-AP trigger frame (M-TF) to initiate the coordinated TXOP, the M-TF being encoded to include a time-sensitive operation information element (IE), the time-sensitive IE indicating how each STA may be to access a channel within the coordinated TXOP. The memory may be configured to store the time-sensitive operation IE.

In some embodiments, for performing the BSS channel level coordination, the processing circuitry may be configured to encode the M-TF to include a TXOP configuration IE. The TXOP IE may indicate a number of service period (SPs) included with a duration of the coordinated TXOP. In some embodiments, if the TXOP configuration IE is configured to include a SP IE configurable to indicate a duration of each of the SPs, a resource assignment for each of the SPs allocating a channel resource to one of the BSSs, and a resource allocation mode for each SP. In some embodiments, the resource allocation mode indicates one of: a trigger-based only resource allocation mode, a contention-based access resource allocation mode; and a contention-free access resource allocation mode.

In some embodiments, when operating as a coordinator AP, the processing circuitry may be configured to decode a multi-AP traffic specification (Multi-AP TSPEC) frame received from one or more of the coordinated APs of the OBSSs. The multi-AP TSPEC frame may include TSPECs for each STA within a BSS.

In some embodiments, when operating as a coordinator AP, the processing circuitry may be configured to encode a Multi-AP TSPEC Trigger frame for transmission to one or more of the coordinated APs to trigger transmission of a Multi-AP TSPEC frame by a coordinated APs. In some embodiments, when operating as a coordinated AP, the processing circuitry may be configured encode a multi-AP traffic specification (Multi-AP TSPEC) frame for transmission to the coordinator AP in response to receipt of time-sensitive requirements from an associated STA or a coordinated AP. The multi-AP TSPEC frame may include TSPECs for each STA within its BSS.

In some embodiments, the processing circuitry of the AP may be configured to control contention with a BSS for protection of time-sensitive traffic. To control contention with the BSS, the processing circuitry may be configured to set a contention access disabled field within an information element (IE) in a beacon, broadcast or management frame.

The contention access may be a disabled field to indicate to STAs of the BSS to disable or pause EDCA contention access and wait for trigger-based access allocations to transmit data. In some embodiments, the disable or pause indication provided in the contention access disabled field may indicate that EDCA contention access may be valid for certain periods of time (i.e., that EDCA contention access may be disabled or paused for certain periods of time) which may be based on the time-sensitive traffic requirements.

In some embodiments, if the EDCA contention access is disabled, the processing circuitry may be configured to include a time-sensitive IE in a trigger frame initiate a TXOP, the trigger being encoded to include a time-sensitive operation IE. The time-sensitive IE may indicate how each STA may be to access the channel within the TXOP. The time-sensitive operation IE may be configurable to indicate to each STA whether channel access may be trigger based only or whether one or more service periods (SPs) are assigned to a STA. When one or more of the SPs are assigned to each STA, an extended SP IE may be configured to indicate whether each SP may be for contention-based access by the STAs or contention-free access by the STAs. In some embodiments, a SP may be assigned to multiple stations and multi-user OFDMA transmissions may be used.

In one or more embodiments, an EHT time-sensitive networking may address the channel access issues that lead to random/variable latency by proposing a new scheduled access framework to enable EHT networks to provide harder guarantees on worst-case latency and jitter in managed scenarios. Some of the features disclosed may also be used in an unmanaged OBSS scenario, but performance may vary depending on the level of interference/congestion in the network. In one or more embodiments, a scheduled time-sensitive operation framework including basic capabilities to address worst-case latency/jitter issues in EHT. In one or more embodiments, an EHT time-sensitive networking system may facilitate a mechanism to enable identification of time-sensitive traffic. Bounded latency/jitter can be provided with high reliability only when the traffic profile/load is known (need to know what is really time-sensitive).

In one or more embodiments, an EHT time-sensitive networking system may facilitate a mechanism to enable the AP to control contention within a BSS and "protect" time-sensitive traffic. In one example embodiment, the "protection" may be provided by blocking or pausing certain (low priority) traffic during certain periods that are reserved for time-sensitive traffic. AP uses trigger-based access to serve STAs based on their requirements and avoid contention with STAs (by signaling a trigger-only operation). Multi-band capabilities can enable "time-sensitive network slice" and scheduling (implementation specific) can control worst-case latency/jitter.

In one or more embodiments, an EHT time-sensitive networking system may facilitate a mechanism to enable a Coordinator AP to coordinate channel access within a managed OBSS scenario. This includes a multiple AP trigger frame capability across coordinated APs.

In one option, this Multi-AP Trigger frame solicits/triggers multiple DL or UL data frames from a set of coordinated APs and STAs associated with the Coordinator AP. In case of UL transmissions from the STAs and coordinated APs, the User Info fields in the Multi-AP TF defines the resource unit allocations. In case of DL transmissions for the STAs and coordinated APs, the EHT-SIG-B in the Multi-AP TF defines the resource unit allocations.

In a second option, this Multi-AP Trigger frame is a resource allocation frame. If the frame is a resource allocation frame, in one embodiment, the frame solicits/triggers a second Trigger frame to be transmitted by one of the coordinated APs at the beginning of the assigned time, which may be defined by a service period. In another embodiment, the resource allocation frame advertises the resource allocations for multiple coordinated APs that initiate frame exchanges at an assigned time (or service period) signaled in the resource allocation frame.

The capabilities enabled by the EHT time-sensitive networking system may will enable EHT to provide bounded latency and jitter with high reliability in managed scenarios, such as enterprise, factories and some homes deployments. This capability is expected to be one of the main new features in EHT and will enable time-sensitive network (TSN) services and ultra-reliable low latency communications (URLLC) over EHT.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of EHT time-sensitive networking, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices. In some embodiments, the user devices 120 and the AP 102 may include one or more computer systems similar to that of the functional diagram of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), or another device. The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 700 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 702.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband. IEEE draft specification IEEE P802.11ax/D4.0, February 2019 is incorporated herein by reference in its entirety.

In one embodiment, and with reference to FIG. 1, AP 102 may facilitate EHT time-sensitive networking 142 with one or more user devices 120. It is understood that the above descriptions are for purposes of illustration and are not meant to be limiting.

Figure 2:
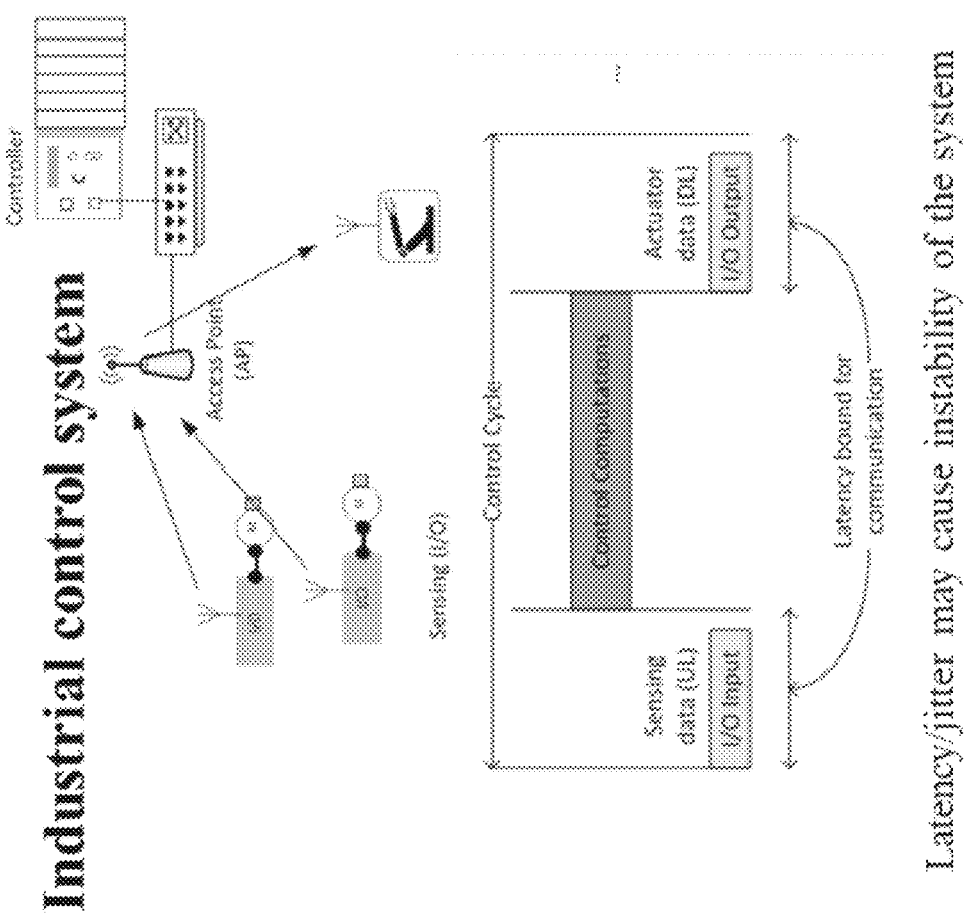
FIG. 2 illustrates worst-case latency problems in time-sensitive applications, in accordance with one or more example embodiments of the present disclosure.
Figure 2:
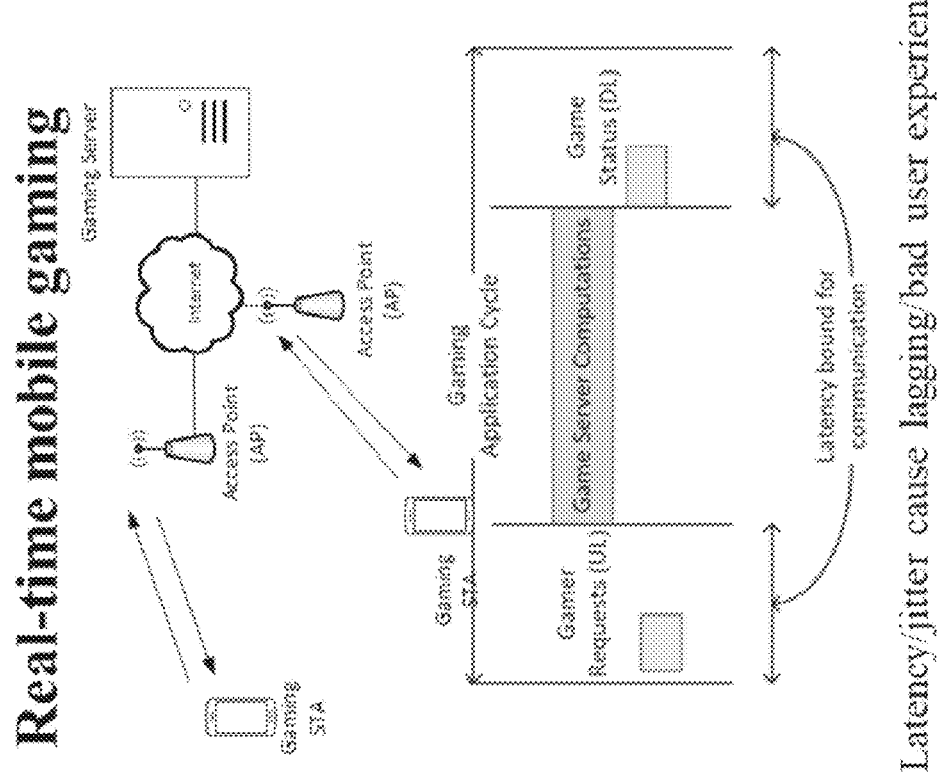

FIG. 2 illustrates worst-case latency problems in time-sensitive applications, in accordance with one or more example embodiments of the present disclosure. Congestion due to contention within a BSS and across OBSSs (Overlapping BSSs) causes variations in channel access latency. Although EDCA, the main 802.11 medium access mechanism, has been successful in resolving contention, but it cannot provide harder bounds on latency/jitter, especially under congestion. EHT is expected to operate in multiple scenarios:

Unmanaged OBSSs: Multiple BSSs/APs may operate in an overlapping area without coordination. EDCA is the main access mode to resolve unmanaged contention/interference. EHT enhancements (e.g. throughput) can reduce latency/jitter, but performance will be limited by interference and contention.

Managed OBSSs: Managed OBSSs consists of multiple BSSs operating in overlapping areas that can be managed and controlled, usually by a single entity. Example scenarios include factory, enterprises, and some multi-AP networks in homes. A more efficient channel access mode can be used to better control latency/jitter in such scenarios to enable bounded latency/jitter performance.

Figure 3:
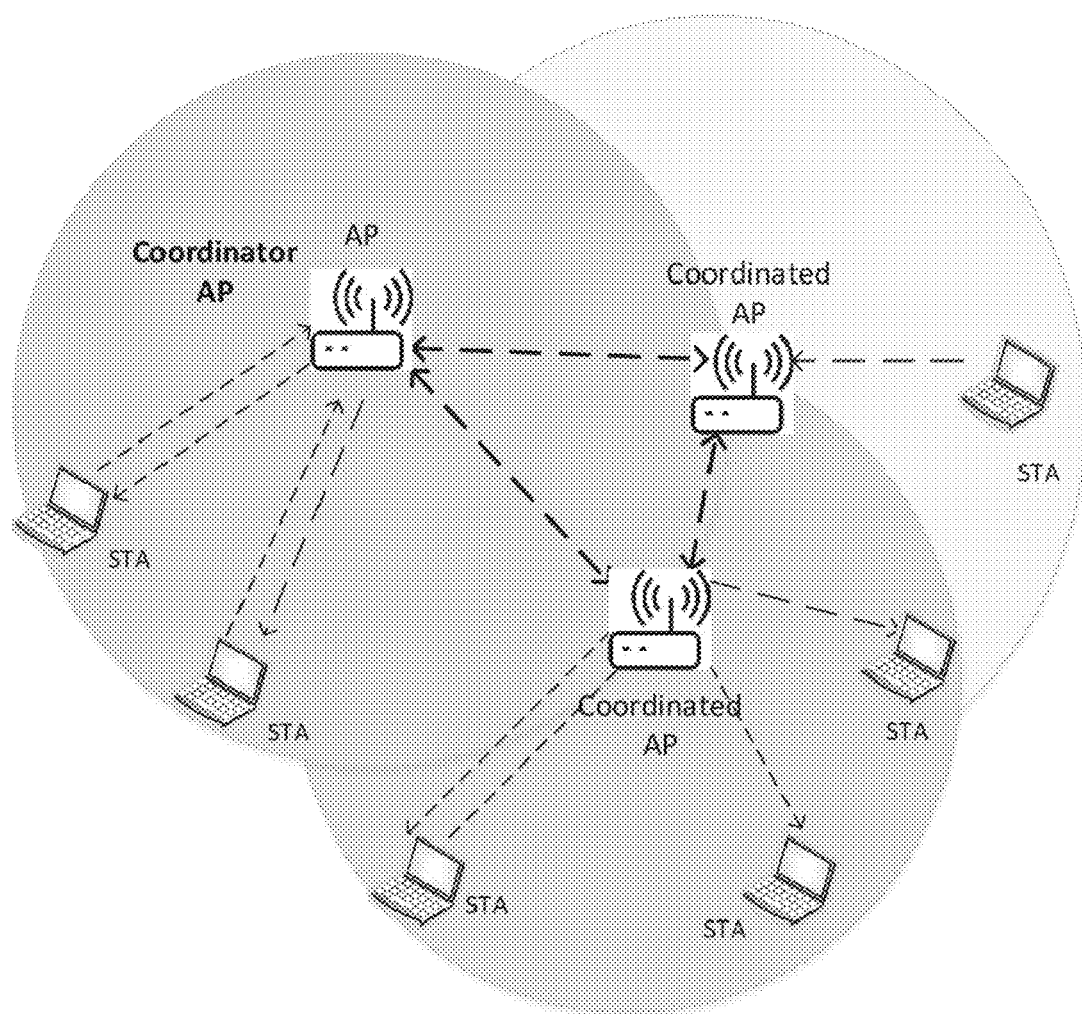
FIG. 3 illustrates a managed OBSS scenario, in accordance with one or more example embodiments of the present disclosure.

FIG. 3 illustrates a managed OBSS scenario, in accordance with one or more example embodiments of the present disclosure. It is assumed that APs can form a coordinated group and one AP is selected as the Coordinator AP, whereas other APs are called Coordinated APs. The group may include APs that are one of more transmission hops away (single-hop and multi-hop scenarios between APs). It is assumed that there is a security relationship between the Coordinator AP and each Coordinated AP.

Capability 1) Mechanism to enable identification of time-sensitive traffic: Existing Access Categories are not enough to indicate specific latency bounds expected by time-sensitive applications. During or after the STA association procedure, the STA that has time-sensitive requirements shall report those requirements to its associated AP. The requirements may be reported using the existing TSPEC information elements in the 802.11 specification or any new IE that includes a description of the time-sensitive traffic requirements, which may include:
  Traffic identifier (or Traffic stream ID);
  Worst case latency;
  Worst case jitter;
  Maximum packet size;
  Packet inter-arrival time;
  Packet delivery ratio (reliability);
  Other optional traffic description information.

Packet delivery ratio is the percentage of packets that are successfully delivered within the worst-case latency (e.g. 99.9% of packets are delivered within a 1 millisecond worst case latency). A new multi-AP traffic specification (Multi-AP TSPEC) frame is introduced to enable coordinated APs to exchange traffic requirements between them and with the coordinator AP in the network. Such Multi-AP TSPEC may include similar information as the typical TSPEC or a new IE as described previously, but it may be transmitted by coordinated APs targeting other coordinated APs and/or the Coordinator AP. The Multi-AP TSPEC may include a list of TSPECs for each STA within that BSS. In another embodiment, the Multi-AP TSPEC may be an AP TSPEC with global requirements for allocations for the AP/BSS to its STAs. In this case, the AP provides a combined description of the requirements within its BSS and it is responsible to schedule the resources it may receive to its associated STAs.

A coordinated AP may trigger a transmission of this frame after receiving new time-sensitive requirements from its associated STAs or other coordinated APs. Alternatively, the Coordinator AP can request coordinated APs to transmit this frame by sending a Multi-AP TSPEC Trigger frame to coordinated APs. This Multi-AP TSPEC Trigger frame solicits the Multi-AP TSPEC report, similar to the BSRP Trigger frame that solicits a buffer status report (BSR) report in 11ax.

Capability 2) Mechanism to enable the AP to control contention within a BSS and "protect" time-sensitive traffic: One key requirement to provide harder guarantees to time-sensitive traffic is the ability to avoid contention between STAs and APs within a BSS. A simple capability is proposed to control contention by enabling the AP to disable the EDCA operation at the STAs and indicate that a trigger-based only time-sensitive operation is allowed.

Step 1) In one embodiment, the AP may set a ContentionAccessDisabled field within an IE in the Beacon frame or other broadcast frames to indicate that the STAs shall disable EDCA contention and wait for trigger-based access allocations in order to transmit data. This capability can enable a fully scheduled operation. This option could be used when the traffic load is deterministic, and the AP is able to implement a schedule that can properly meet the time-sensitive requirement of all STAs. In one variation of this capability, the AP may indicate that EDCA contention is only disabled for data traffic but allows STAs to still transmit small control or management frames (e.g. to request service/bandwidth). The ContentionAccessDisabled signaling may include 2 bits defined as follows:
  00: EDCA is enabled.
  01: Indicates EDCA shall be disabled for data frame transmissions
  10: Indicates EDCA shall be disabled for all frames.
  11: reserved
In one example embodiment the ContentionAccessDisabled may be valid only during certain time periods (e.g. service periods reserved for time-sensitive traffic).

Step 2) The AP is given the flexibility to avoid contention by disabling EDCA (step 1) and scheduling resources to meet the time sensitive requirements as well as other traffic requirements within the BSS. The AP includes a time-sensitive operation IE in a trigger-frame (or other management frames) to reserve a transmission opportunity. The time-sensitive operation IE may include information configuring how STAs shall access the channel within the reserved transmission opportunity, such as:
  Trigger-based only: EDCA is disabled, only the AP can access the medium and STAs shall use the resource allocation in the trigger frame for uplink transmissions;
  Assigned service periods: the AP can assign the reserved transmission opportunity to one of more STAs, by dividing it in multiple service periods. An extended SP IE defines the duration and the STA assignment to each SP, as well as the channel access within an assigned SP, which may be:

Contention-based access: STAs can use EDCA contention within the SP. Additional restrictions may be applied to the contention-based transmission, such as maximum TXOP length and traffic type.

Contention-free access: STAs can access the channel after CCA, without contention within the SP.

In both access mechanism, STAs shall restrict their transmissions to the duration of their assigned SPs. A periodic transmission opportunity reservation may also be signed by including the time-sensitive operation IE in a beacon or other management frame and specifying the duration, the access mode (as indicated above), a service interval and number of repetitions. This capability may also be used by STAs to configure their power save modes.

When Steps 1 and 2 are used together, the network can provide a completely scheduled service. However, Steps 1 and 2 may also be used independently.

Capability 3) Mechanism to enable a Coordinator AP to coordinate channel access within a managed OBSS scenario. This capability extends capability #2 to a group of managed BSSs and enables a Coordinator AP to manage the contention across multiple OBSSs. This capability may be enabled in two ways, which are not mutually exclusive:

Option 1 (BSS channel level coordination): The coordinator AP can assign non-overlapping channels to the managed BSSs, such that each coordinated AP/BSS can use capabilities 1 and 2 to schedule time-sensitive transmissions to ensure bounded latency/jitter per BSS. A management frame may be used to exchange channel assignment information and time-sensitive signaling between the Coordinator AP and Coordinated APs. The Coordinated AP initiates the channel coordination by sending a channel management frame and time-sensitive operation. A Coordinated AP may also transmit channel management frames including information received from the Coordinated AP. The channel management frame may include information indicating channel(s) which should be used to serve time-sensitive traffic. This capability can enable the Coordinator AP to steer traffic and avoid congestion and latency issues caused by mixing time-sensitive and other traffic classes in the same channel.

Option 2 (Transmission level coordination): This option is required for managed BSSs to operate on the same channel. The Coordinator AP is responsible for initiating a coordinated transmission opportunity and configuring/assigning resources to control contention across the managed BSSs. The Coordinator AP uses a control/management frame, referred here as Multi-AP Trigger Frame (M-TF), to initiate a transmission opportunity during which transmissions across the managed BSSs are coordinated to better serve time-sensitive traffic.

The M-TF includes a transmission opportunity configuration IE that signals the resource allocation and channel access options for this reserved period (illustrated in FIG. 3):

Transmission opportunity configuration: indicates how the resources are configured within the transmission opportunity, which may include the following options:

Number of service periods: indicates the number of service periods that may be included within the duration of the transmission opportunity;

Service Period (SP) Information Element:

Duration: the duration of the service period;

Resource assignment: Indicates the resource assignment for the SP, i.e., which BSSs (or traffic type) are allowed to use the SP. If a BSS is not assigned to a given SP, it shall not transmit during the SP;

Resource allocation mode:

Trigger-based only: Coordinated APs and STAs wait for resource allocation in a trigger frame. The Coordinator AP schedules the time-frequency resources for Coordinated APs. The Coordinated AP can use its resources for downlink data transmission or to trigger its STAs for uplink data transmissions;

Contention-based access: Coordinated APs and STAs can use EDCA to access the channel for data transmissions within the assigned service period. Additional restrictions may be applied to the contention-based transmission, such as maximum TXOP length and traffic type.

Contention-free access: the BSS shall use the contention-free access as indicated in Capability #2 (option 2). This option shall only be used when the SP is assigned to a single BSS.

Multiple options can be implemented with the proposed configuration parameters. For instance, the Coordinator AP may assign the entire transmission opportunity to a single BSS and implement a Round Robin Scheduling to serve the multiple BSSs. In another example shown in FIG. 5, the transmission opportunity is divided in two SPs. The first SP is assigned to BSS 1 and BSS 2, whereas the second SP is assigned to BSS 3. In another example each BSS is assigned a dedicated SP within the transmission period.

Once the resource is assigned, each AP is responsible for informing its assigned STAs, which can be done according to the Capability 2 described previously. However, it important to note that each Coordinated AP shall follow the resource assignments and allocation options defined by the Coordinator AP in the M-TF. Each coordinated AP may schedule its own STAs and prioritize its time-sensitive and other traffic within its assigned resources.

Figure 4:
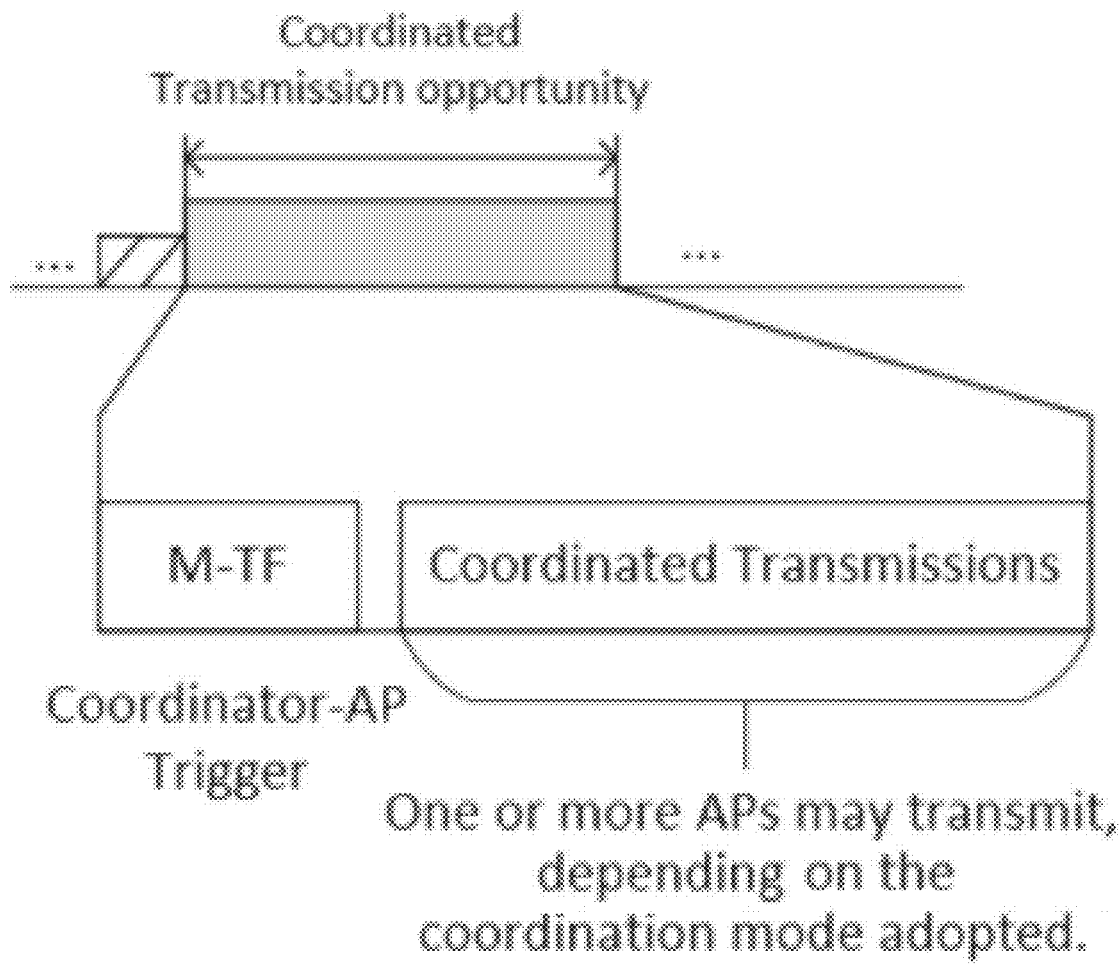
FIG. 4 illustrates trigger-based transmission period for time-sensitive operation, in accordance with one or more example embodiments of the present disclosure.

FIG. 4 illustrates trigger-based transmission period for time-sensitive operation, in accordance with one or more example embodiments of the present disclosure.

Figure 5:
FIG. 5 illustrates resource allocation options within a triggered transmission period with time-sensitive operation, in accordance with one or more example embodiments of the present disclosure.
Figure 5:
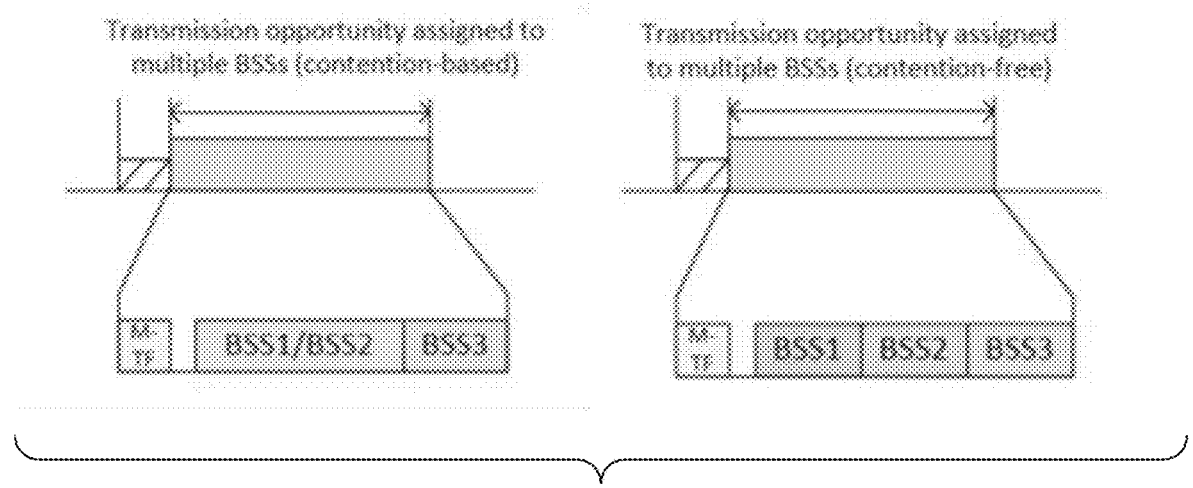

FIG. 5 illustrates resource allocation options within a triggered transmission period with time-sensitive operation, in accordance with one or more example embodiments of the present disclosure The M-TF can be used in a multi-hop coordination hierarchy as long as the transmissions fit within the resources assigned by the Coordinator AP. In such scenarios, an AP may generate another M-TF within its assigned resources to inform other coordinated AP under its management in the overall coordination hierarchy.

Figure 6:
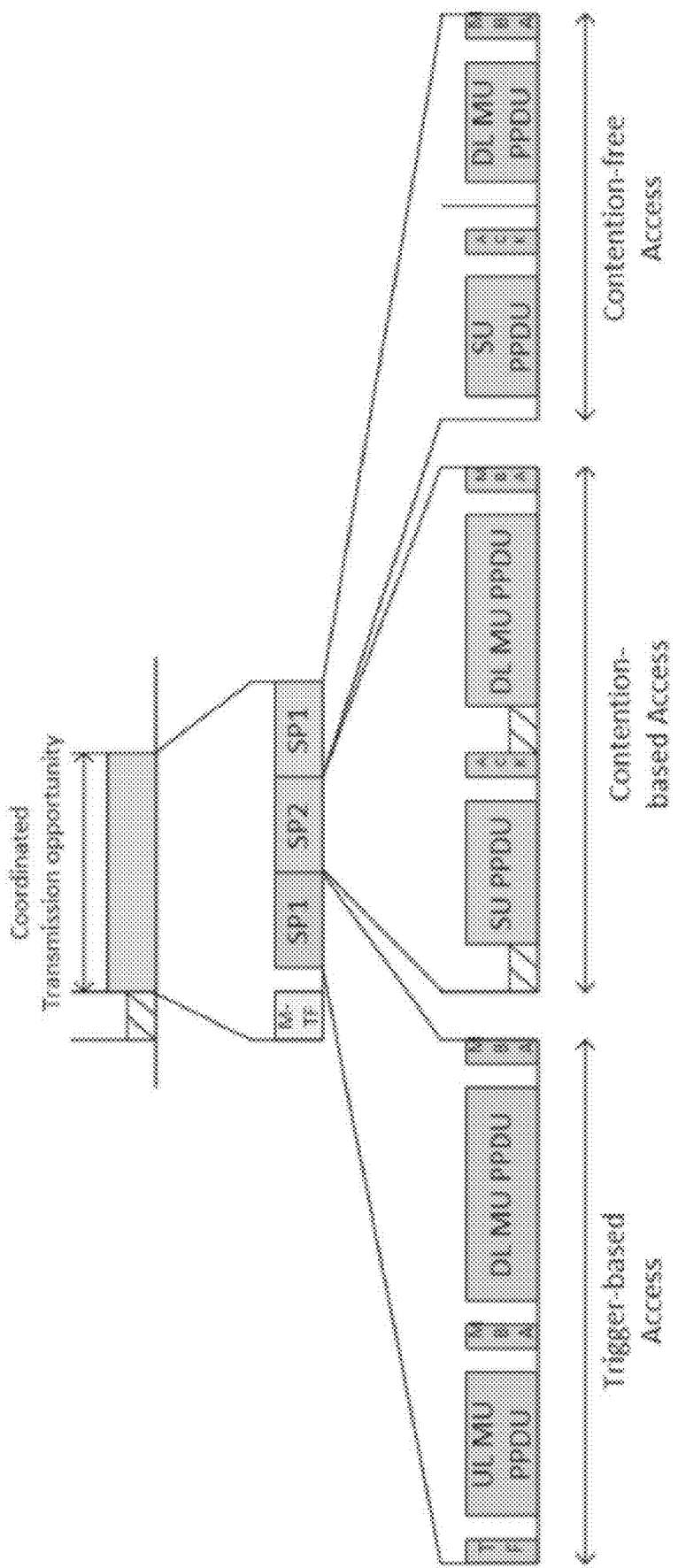
FIG. 6 illustrates a flexible configuration for time-sensitive operation, in accordance with one or more example embodiments of the present disclosure.

FIG. 6 illustrates a flexible configuration for time-sensitive operation, in accordance with one or more example embodiments of the present disclosure. The M-TF defines three service periods within a transmission period, each SP using a different resource allocation mode. The first SP is configured to trigger-based access and assigned to BSS1, which uses the resource to trigger UL transmissions (UL MU PPDU) and for a downlink multi-user transmission. The second SP, e.g. assigned to BSS 2, allows contention based SU and MU transmissions. Note that the contention-based transmissions are limited by the duration of the SP 2. Finally, the third SP is sub-divided by BSS 3 in multiple contention-free service periods, which may be assigned to STAs for single user transmissions or to the AP itself for downlink MU transmissions.

Figure 7:
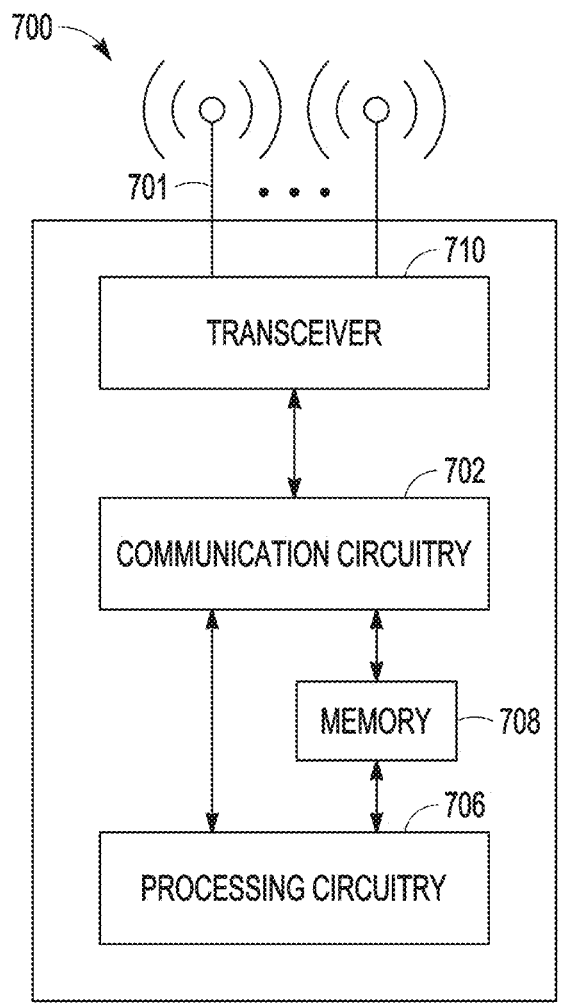
FIG. 7 illustrates a functional diagram of an exemplary communication station that may be suitable for use as a user device, in accordance with one or more example embodiments of the present disclosure.

FIG. 7 illustrates a functional diagram of an exemplary communication station that may be suitable for use as a user device, in accordance with one or more example embodiments of the present disclosure. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an extremely high throughput (EHT) access point (AP), the apparatus comprising: processing circuitry; and memory, the processing circuitry configured to:

announce, with one or more management frames, one or more restricted service periods (SPs) for latency sensitive traffic;

wherein each of the one or more restricted SPs comprise a restricted period of time during which member stations (STAs) transmit and/or receive quality-of-service (QoS) data frames of a traffic flow that comprise the latency sensitivity traffic;

include an information element (IE) in the management frames that defines characteristics and QoS expectations that belong to the traffic flow of the latency sensitivity traffic; and prioritize delivery of the QoS data frames of the traffic flow during the restricted SPs.

2. The apparatus of claim 1, wherein for QoS data frames of the traffic flow that are scheduled for transmission by the AP, the processing circuitry is to prioritize delivery to a member STA by ensuring that the QoS data frames of the traffic stream are first delivered during the restricted SPs.

3. The apparatus of claim 2, wherein for QoS data frames of the traffic flow that are trigger enabled for transmission by the member STA, the processing circuitry is to prioritize delivery by first triggering the member STA to deliver the QoS data frames of the traffic flow during the restricted SPs.

4. The apparatus of claim 3, wherein the latency sensitive traffic comprises a plurality of traffic flows, each traffic flow identified by a traffic stream identifier, wherein the restricted SP has one or more member STAs, and wherein the processing circuitry is configured to map the traffic stream identifiers to links set up with the member stations.

5. The apparatus of claim 2, wherein the traffic flows are communicated in accordance with the characteristics and QoS expectations during the restricted SP.

6. The apparatus of claim 5, wherein to initiate a QoS setup for a traffic flow to be communicated with a member STA during the restricted SP, the processing circuitry is configured to encode a request frame that includes a traffic classification elements field describing a traffic classification to be applied to the traffic flow.

7. The apparatus of claim 6, wherein when the AP is configured by the processing circuitry to operate as a coordinator AP for performing basic service set (BSS) channel level coordination, the coordinator AP is configured to assign non-overlapping channels to one or more coordinated APs of overlapping BSSs (OBSSs) to coordinate the latency sensitive traffic per BSS, wherein to perform the BSS channel level coordination, the processing circuitry of the coordinator AP is configured to exchange channel management frames with the coordinated APs, wherein the channel management frames indicate one or more channels to be used for the latency sensitive traffic.

8. A non-transitory computer-readable storage medium that stores instructions for execution by processing circuitry of an extremely high throughput (EHT) access point (AP), the processing circuitry configured to:

announce, with one or more management frames, one or more restricted service periods (SPs) for latency sensitive traffic;

wherein each of the one or more restricted SPs comprise a restricted period of time during which member stations (STAs) transmit and/or receive quality-of-service (QoS) data frames of a traffic flow that comprise the latency sensitivity traffic;

include an information element (IE) in the management frames that defines characteristics and QoS expectations that belong to the traffic flow of the latency sensitivity traffic; and prioritize delivery of the QoS data frames of the traffic flow during the restricted SPs.

9. The non-transitory computer-readable storage medium of claim 8, wherein for QoS data frames of the traffic flow that are scheduled for transmission by the AP, the processing circuitry is to prioritize delivery to a member STA by ensuring that the QoS data frames of the traffic stream are first delivered during the restricted SPs.

10. The non-transitory computer-readable storage medium of claim 9, wherein for QoS data frames of the traffic flow that are trigger enabled for transmission by the member STA, the processing circuitry is to prioritize delivery by first triggering the member STA to deliver the QoS data frames of the traffic flow during the restricted SPs.

11. The non-transitory computer-readable storage medium of claim 10, wherein the latency sensitive traffic comprises a plurality of traffic flows, each traffic flow identified by a traffic stream identifier, wherein the restricted SP has one or more member STAs, and wherein the processing circuitry is configured to map the traffic stream identifiers to links set up with the member stations.

12. The non-transitory computer-readable storage medium of claim 9, wherein the traffic flows are communicated in accordance with the characteristics and QoS expectations during the restricted SP.

13. The non-transitory computer-readable storage medium of claim 12, wherein to initiate a QoS setup for a traffic flow to be communicated with a member STA during the restricted SP, the processing circuitry is configured to encode a request frame that includes a traffic classification elements field describing a traffic classification to be applied to the traffic flow.

14. The non-transitory computer-readable storage medium of claim 13, wherein when the AP is configured by the processing circuitry to operate as a coordinator AP for performing basic service set (BSS) channel level coordination, the coordinator AP is configured to assign non-overlapping channels to one or more coordinated APs of overlapping BSSs (OBSSs) to coordinate the latency sensitive traffic per BSS, wherein to perform the BSS channel level coordination, the processing circuitry of the coordinator AP is configured to exchange channel management frames with the coordinated APs, wherein the channel management frames indicate one or more channels to be used for the latency sensitive traffic.

15. A method performed by processing circuitry of extremely high throughput (EHT) access point (AP) for communicating latency sensitive traffic, the method comprising:

announcing, with one or more management frames, one or more restricted service periods (SPs) for latency sensitive traffic;

wherein each of the one or more restricted SPs comprise a restricted period of time during which member stations (STAs) transmit and/or receive quality-of-service (QoS) data frames of a traffic flow that comprise the latency sensitivity traffic;

including an information element (IE) in the management frames that defines characteristics and QoS expectations that belong to the traffic flow of the latency sensitivity traffic; and prioritizing delivery of the QoS data frames of the traffic flow during the restricted SPs.

16. The method of claim 15, wherein for QoS data frames of the traffic flow that are scheduled for transmission by the AP, the processing circuitry is to prioritize delivery to a member STA by ensuring that the QoS data frames of the traffic stream are first delivered during the restricted SPs.

17. The method of claim 16, wherein for QoS data frames of the traffic flow that are trigger enabled for transmission by the member STA, the processing circuitry is to prioritize delivery by first triggering the member STA to deliver the QoS data frames of the traffic flow during the restricted SPs.

18. The method of claim 17, wherein the latency sensitive traffic comprises a plurality of traffic flows, each traffic flow identified by a traffic stream identifier, wherein the restricted SP has one or more member STAs, and wherein the processing circuitry is configured to map the traffic stream identifiers to links set up with the member stations.

19. The method of claim 16, wherein the traffic flows are communicated in accordance with the characteristics and QoS expectations during the restricted SP.

20. The method of claim 19, wherein to initiate a QoS setup for a traffic flow to be communicated with a member STA during the restricted SP, the processing circuitry is configured to encode a request frame that includes a traffic classification elements field describing a traffic classification to be applied to the traffic flow, wherein when the AP is configured by the processing circuitry to operate as a coordinator AP for performing basic service set (BSS) channel level coordination, the coordinator AP is configured to assign non-overlapping channels to one or more coordinated APs of overlapping BSSs (OBSSs) to coordinate the latency sensitive traffic per BSS, wherein to perform the BSS channel level coordination, the processing circuitry of the coordinator AP is configured to exchange channel management frames with the coordinated APs, wherein the channel management frames indicate one or more channels to be used for the latency sensitive traffic.

\* \* \* \* \*

UNITED STATES PATENT AND TRADEMARK OFFICE
CERTIFICATE OF CORRECTION

PATENT NO. : 11,696,225 B2  
APPLICATION NO. : 17/751018  
DATED : July 4, 2023  
INVENTOR(S) : Cavalcanti et al.

Page 1 of 1

It is certified that error appears in the above-identified patent and that said Letters Patent is hereby corrected as shown below:

On the Title Page

On page 2, in Column 2, under item (56) "U.S. Patent Documents", Line 11, delete "2020/0036721" and insert --2020/0367210-- therefor Signed and Sealed this  
Fifteenth Day of October, 2024

Katherine Kelly Vidal  
*Director of the United States Patent and Trademark Office*